(12) United States Patent
Lesso (10) Patent No.: US 11,935,541 B2
(45) Date of Patent: Mar. 19, 2024

(54) SPEECH RECOGNITION

(71) Applicant: Cirrus Logic International Semiconductor Ltd., Edinburgh (GB)

(72) Inventor: John Paul Lesso, Edinburgh (GB)

(73) Assignee: Cirrus Logic Inc., Austin, TX (US)

( * ) Notice: Subject to any disclaimer, the term of this patent is extended or adjusted under 35 U.S.C. 154(b) by 171 days.

(21) Appl. No.: 17/121,153

(22) Filed: Dec. 14, 2020

(65) Prior Publication Data

US 2021/0134297 A1   May 6, 2021

Related U.S. Application Data

(63) Continuation of application No. 16/115,654, filed on Aug. 29, 2018, now Pat. No. 10,923,128.

(51) Int. Cl.
*G10L 15/00* (2013.01)
*G06F 21/60* (2013.01)
(Continued)

(52) U.S. Cl.
CPC .............. *G10L 17/00* (2013.01); *G06F 21/60* (2013.01); *G10L 15/00* (2013.01); *G10L 15/26* (2013.01);
(Continued)

(58) Field of Classification Search
None
See application file for complete search history.

(56) References Cited

U.S. PATENT DOCUMENTS

| 6,049,768 A ‡ | 4/2000 | Goldberg | G10L 17/24 704/273 |
| 7,062,650 B2 ‡ | 6/2006 | Robbins | G06F 21/10 713/165 |

(Continued)

FOREIGN PATENT DOCUMENTS

| EP | 2669889 A2 ‡ | 12/2013 | G06F 3/167 |
| EP | 2669889 A2 | 12/2013 | |

(Continued)

OTHER PUBLICATIONS

International Search Report and Written Opinion of the International Searching Authority, International Application No. PCT/GB2019/052401, dated Oct. 17, 2019.‡

*Primary Examiner* — Richard Z Zhu
(74) *Attorney, Agent, or Firm* — Jackson Walker L.L.P.

(57) ABSTRACT

A method of performing speech recognition, comprises, at a first device: receiving an audio signal representing speech; performing a first data integrity check operation on the received audio signal; performing a speaker recognition process on the received audio signal; forwarding the received audio signal to a second device, wherein the second device comprises a speech recognition function; and forwarding an output of the first data integrity check operation to the second device. The method further comprises, at the second device: receiving the audio signal forwarded from the first device; receiving the output of the first data integrity check operation forwarded from the first device; performing a second data integrity check operation on the audio signal forwarded from the first device; and using a result of performing the speech recognition function on the audio signal forwarded from the first device only if an output of the (Continued)

second data integrity check operation matches the output of the first data integrity check operation forwarded from the first device.

17 Claims, 8 Drawing Sheets

(51) Int. Cl.
*G10L 15/26* (2006.01)
*G10L 17/00* (2013.01)
*G06F 21/64* (2013.01)
*G10L 15/02* (2006.01)
*G10L 15/08* (2006.01)

(52) U.S. Cl.
CPC .............. *G06F 21/64* (2013.01); *G10L 15/02* (2013.01); *G10L 15/08* (2013.01)

(56) References Cited

U.S. PATENT DOCUMENTS

| | | | | |
|---|---|---|---|---|
| 7,502,934 B2 * | 3/2009 | Dietl | ...................... | G06F 21/64 |
| | | | | 713/176 |
| 7,581,105 B2 * | 8/2009 | Dietl | ...................... | G06F 21/64 |
| | | | | 713/176 |
| 8,078,878 B2 * | 12/2011 | Dietl | ...................... | H04L 9/3231 |
| | | | | 713/176 |
| 8,583,931 B2 * | 11/2013 | Dietl | ...................... | H04L 9/3247 |
| | | | | 713/176 |
| 9,032,219 B2 ‡ | 5/2015 | Ganong, III | ............ | G10L 15/28 |
| | | | | 713/189 |
| 9,230,548 B2 ‡ | 1/2016 | Fastow | .................. | G10L 15/285 |
| 9,431,016 B2 * | 8/2016 | Aviles-Casco | ......... | H04L 9/3231 |
| 9,622,053 B1 ‡ | 4/2017 | Heinen | .................... | G10L 15/01 |
| 9,978,367 B2 * | 5/2018 | Aleksic | ................... | G10L 15/22 |
| 10,056,084 B2 * | 8/2018 | Aviles-Casco | .......... | G10L 17/02 |
| 10,553,214 B2 * | 2/2020 | Aleksic | .................. | G10L 15/26 |
| 2002/0194003 A1 * | 12/2002 | Mozer | ..................... | G10L 17/00 |
| | | | | 704/270.1 |
| 2004/0102959 A1 ‡ | 5/2004 | Estrin | ...................... | G07C 9/37 |
| | | | | 704/8 |
| 2010/0131272 A1 ‡ | 5/2010 | Wu | ...................... | H04L 9/3236 |
| | | | | 704/243 |
| 2014/0143550 A1 ‡ | 5/2014 | Ganong, III | ......... | G06F 21/606 |
| | | | | 713/189 |
| 2015/0058017 A1 * | 2/2015 | Singh | ..................... | G06F 21/10 |
| | | | | 704/249 |
| 2015/0348558 A1 ‡ | 12/2015 | Riedmiller | ............ | G10L 19/167 |
| | | | | 704/500 |
| 2016/0019894 A1 ‡ | 1/2016 | Tsujikawa | ............... | G10L 15/26 |
| | | | | 704/23 |
| 2016/0118044 A1 ‡ | 4/2016 | Bondarev | ............. | G06F 16/685 |
| | | | | 704/23 |
| 2018/0061412 A1 ‡ | 3/2018 | Cho | ........................ | G06F 3/167 |
| 2019/0122670 A1 * | 4/2019 | Roberts | ................... | G10L 17/22 |
| 2019/0197222 A1 * | 6/2019 | Clark | ...................... | G06F 3/167 |
| 2020/0076621 A1 * | 3/2020 | Lesso | ..................... | G06F 21/32 |

FOREIGN PATENT DOCUMENTS

| | | | | |
|---|---|---|---|---|
| GB | 2363236 A | ‡ | 12/2001 | ............ G10L 15/30 |
| GB | 2363236 A | | 12/2001 | |

* cited by examiner
‡ imported from a related application

SPEECH RECOGNITION

This application is a continuation of U.S. patent application Ser. No. 16/115,654, filed Aug. 29, 2018, which is incorporated by reference herein in its entirety.

TECHNICAL FIELD

This invention relates to speech recognition, and in particular to a system that performs both speaker recognition and speech recognition.

In this document, the term speaker recognition is used to refer to a process in which information is obtained about the identity of a speaker. For example, this process may involve determining whether or not the speaker is a specific individual (speaker verification), or may involve identifying the speaker, for example from a group of enrolled speakers (speaker identification).

The term speech recognition is used to refer to a process in which information is obtained about the content of speech, for example in order to be able to determine what the speaker is saying.

BACKGROUND

Systems are known in which a verbal command from a speaker is recognised and processed, subject to the speaker's identity being verified. One such system is disclosed in GB-2515527A, for example, in which, if it is determined that a predetermined trigger phrase has been spoken, a speaker recognition process is performed in a first device. If the speaker recognition process determines that the predetermined trigger phrase was spoken by a specific enrolled user, the signal representing the speech is passed to a speech recognition engine, which is provided in a second device. Typically, such a system may be used to allow the user to issue voice commands, causing the system to perform some action, or retrieve some requested information, for example.

One problem that could in theory arise in such a system is an attack, in which a third party attempts to gain unauthorised access to the system, by providing a recording of the enrolled user's speech to the speaker recognition process, but then providing a signal containing their own speech to the speech recognition engine. The speaker recognition process would signal that the enrolled user was speaking, but the command that the speech recognition process would recognise may be a command that the enrolled user would not want to issue.

SUMMARY

According to an aspect of the present invention, there is provided a method of performing speech recognition, comprising:

at a first device:
receiving an audio signal representing speech;
performing a first data integrity check operation on the received audio signal;
performing a speaker recognition process on the received audio signal;
forwarding the received audio signal to a second device, wherein the second device comprises a speech recognition function; and
forwarding an output of the first data integrity check operation to the second device; and
at the second device:
receiving the audio signal forwarded from the first device;
receiving the output of the first data integrity check operation forwarded from the first device;
performing a second data integrity check operation on the audio signal forwarded from the first device; and
using a result of performing the speech recognition function on the audio signal forwarded from the first device only if an output of the second data integrity check operation matches the output of the first data integrity check operation forwarded from the first device.

The method may further comprise:
using a result of performing the speech recognition function on the audio signal forwarded from the first device only if a result of performing the speaker recognition process on the received audio signal satisfies a predetermined criterion.

The method may further comprise:
performing the speech recognition function on the audio signal forwarded from the first device only if an output of the second data integrity check operation matches the output of the first data integrity check operation forwarded from the first device, and if the result of performing the speaker recognition process on the received audio signal satisfies the predetermined criterion.

The method may comprise:
performing the speech recognition function on the audio signal forwarded from the first device;
determining if an output of the second data integrity check operation matches the output of the first data integrity check operation forwarded from the first device; and
using the result of performing the speech recognition function on the audio signal forwarded from the first device only if the output of the second data integrity check operation matches the output of the first data integrity check operation forwarded from the first device.

The method may further comprise:
if the output of the second data integrity check operation does not match the output of the first data integrity check operation forwarded from the first device, deleting the result of performing the speech recognition function on the audio signal forwarded from the first device.

The method may comprise performing the speech recognition function on the audio signal in the second device at least partly in parallel with performing the speaker recognition process on the received audio signal in the first device.

The method may comprise determining in the second device if the output of the second data integrity check operation matches the output of the first data integrity check operation forwarded from the first device, at least partly in parallel with performing the speaker recognition process on the received audio signal in the first device.

The method may comprise, if it is determined in the second device that the output of the second data integrity check operation matches the output of the first data integrity check operation forwarded from the first device, performing the speech recognition function on the audio signal in the second device at least partly in parallel with performing the speaker recognition process on the received audio signal in the first device.

The method may comprise performing the first data integrity check operation on the received audio signal only if it is determined that the audio signal represents a predetermined trigger phrase.

The step of performing the first data integrity check operation may comprise obtaining a predetermined hash function, and wherein the step of performing the second data integrity check operation comprises obtaining said predetermined hash function.

According to a second aspect of the invention, there is provided a system for performing speech recognition, comprising:
a first device and a second device,
wherein the first device comprises:
an input for receiving an audio signal representing speech;
a processor for performing a first data integrity check operation on the received audio signal, and for performing a speaker recognition process on the received audio signal; and
an interface for forwarding the received audio signal to the second device, and for forwarding an output of the first data integrity check operation to the second device; and
wherein the second device is configured for performing a speech recognition function, and comprises:
an interface for receiving the audio signal forwarded from the first device, and for receiving the output of the first data integrity check operation forwarded from the first device; and
a processor for performing a second data integrity check operation on the audio signal forwarded from the first device;
wherein the system is configured to use a result of performing the speech recognition function on the audio signal forwarded from the first device only if an output of the second data integrity check operation matches the output of the first data integrity check operation forwarded from the first device.

The system may be configured to use the result of performing the speech recognition function on the audio signal forwarded from the first device only if a result of performing the speaker recognition process on the received audio signal satisfies a predetermined criterion.

The second device may be configured to perform the speech recognition function on the audio signal forwarded from the first device only if an output of the second data integrity check operation matches the output of the first data integrity check operation forwarded from the first device, and if the result of performing the speaker recognition process on the received audio signal satisfies the predetermined criterion.

The system may be configured for:
performing the speech recognition function on the audio signal forwarded from the first device;
determining if an output of the second data integrity check operation matches the output of the first data integrity check operation forwarded from the first device; and
using the result of performing the speech recognition function on the audio signal forwarded from the first device only if the output of the second data integrity check operation matches the output of the first data integrity check operation forwarded from the first device.

The system may be further configured for:
if the output of the second data integrity check operation does not match the output of the first data integrity check operation forwarded from the first device, deleting the result of performing the speech recognition function on the audio signal forwarded from the first device.

The system may be further configured for performing the speech recognition function on the audio signal in the second device at least partly in parallel with performing the speaker recognition process on the received audio signal in the first device.

The second device may be further configured for determining if the output of the second data integrity check operation matches the output of the first data integrity check operation forwarded from the first device, at least partly in parallel with performing the speaker recognition process on the received audio signal in the first device.

The second device may be further configured for, if it is determined that the output of the second data integrity check operation matches the output of the first data integrity check operation forwarded from the first device, performing the speech recognition function on the audio signal in the second device at least partly in parallel with performing the speaker recognition process on the received audio signal in the first device.

The first device may be configured for performing the first data integrity check operation on the received audio signal only if it is determined that the audio signal represents a predetermined trigger phrase.

Performing the first data integrity check operation may comprise obtaining a predetermined hash function, and wherein performing the second data integrity check operation may comprise obtaining said predetermined hash function.

The first device and the second device may be separate integrated circuits in an electronic device.

The first device may be an electronic device, and the second device may be a remotely located computing device.

The second device may be an electronic device, and the first device may be an accessory for use with the second device.

In any of these examples, the electronic device may be a smartphone or other communications device, a smart speaker, a tablet or laptop computer, a games console, a home control system, a home entertainment system, an in-vehicle entertainment system, or a domestic appliance.

According to a further aspect, there is provided a method of operation of a first device in a speech recognition system, the method comprising:
receiving an audio signal representing speech;
performing a first data integrity check operation on the received audio signal;
performing a speaker recognition process on the received audio signal;
forwarding the received audio signal to a second device, wherein the second device comprises a speech recognition function; and
forwarding an output of the first data integrity check operation to the second device.

According to a further aspect, there is provided a first device configured to operate in accordance with the method.

The first device may be an integrated circuit. Alternatively, the first device may be an electronic device, for example a smartphone or other communications device, a smart speaker, a tablet or laptop computer, a games console, a home control system, a home entertainment system, an in-vehicle entertainment system, or a domestic appliance.

According to a further aspect, there is provided a method of operation of a second device in a speech recognition system, wherein the second device comprises a speech recognition function, the method comprising:
receiving from a first device an audio signal representing speech;
receiving from the first device an output of a first data integrity check operation;

performing a second data integrity check operation on the audio signal forwarded from the first device; and using a result of performing the speech recognition function on the audio signal forwarded from the first device only if an output of the second data integrity check operation matches the output of the first data integrity check operation forwarded from the first device.

The method may further comprise:

using the result of performing the speech recognition function on the audio signal forwarded from the first device only in response to receiving from the first device an indication that a result of performing a speaker recognition process on the received audio signal satisfies a predetermined criterion.

According to a further aspect, there is provided a second device configured to operate in accordance with the method.

The second device may be an integrated circuit. Alternatively, the second device may be an electronic device, for example a smartphone or other communications device, a smart speaker, a tablet or laptop computer, a games console, a home control system, a home entertainment system, an in-vehicle entertainment system, or a domestic appliance.

According to a further aspect, there is provided a method for providing an authenticated/identified speech recognition output, the method comprising the steps of:

receiving audio including speech;

providing the received audio to a speaker recognition module, to authenticate/identify a speaker, wherein the step of providing the received audio to a speaker recognition module comprises performing a first data integrity check operation on the received audio signal;

providing the received audio to a speech recognition module, to recognise speech in the received audio, wherein the step of providing the received audio to the speech recognition module comprises performing a second data integrity check operation on the received audio signal;

comparing the output of the first and second data integrity check operations to determine the audio provided to the speaker recognition module is the same as the audio provided to the speech recognition module, wherein the outputs of the speaker recognition module and the speech recognition module are combined to provide an authenticated/identified speech recognition output when said comparison step determines that the audio provided to the speaker recognition module is the same as the audio provided to the speech recognition module.

According to a further aspect, there is provided a non-transitory storage medium having stored thereon software code which, when run on a suitable processor, performs any of the methods described above.

This has the advantage that the speech that is provided to the speech recognition function can be seen to be the same as the speech that was provided to the speaker recognition process, ensuring that the attack described above cannot be successful.

DETAILED DESCRIPTION

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

Figure 1:
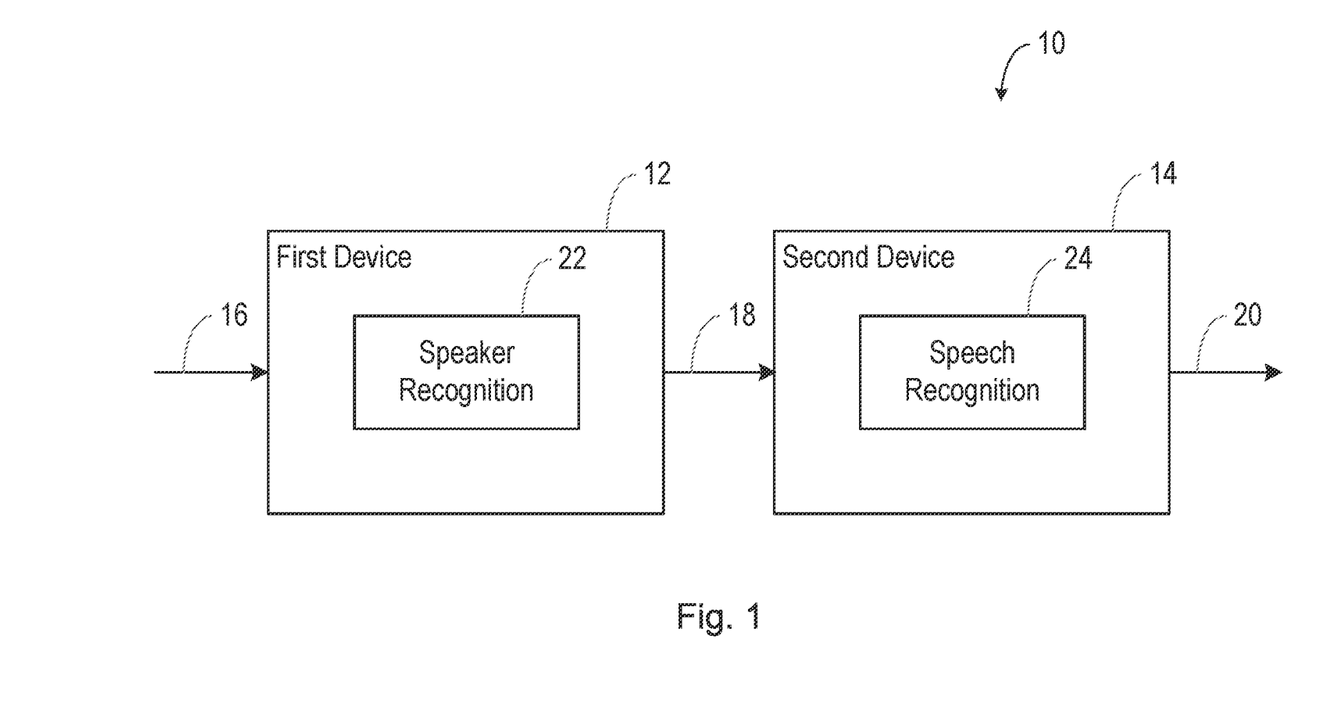
FIG. 1 illustrates a system in accordance with an aspect of the invention.

FIG. 1 shows a system in accordance with an aspect of the invention. Specifically, FIG. 1 shows a system 10, which includes a first device 12 and a second device 14. An input signal can be supplied to the first device 12 on an input line 16. The first device 12 has a direct or indirect connection 18 to the second device. The second device 14 provides an output on an output connection 20.

The first device 12 includes a speaker recognition block 22. When the input signal supplied to the first device 12 on the input line 16 represents speech, the speaker recognition block 22 may for example determine whether or not the speaker is a specific individual, or may identify the speaker from a group of enrolled speakers.

The second device 14 includes a speech recognition block 24. When an input signal supplied to the second device 14 represents speech, the speech recognition block 24 may obtain information about the content of speech, for example in order to be able to determine the content of a command that was uttered by the speaker.

Figure 2:
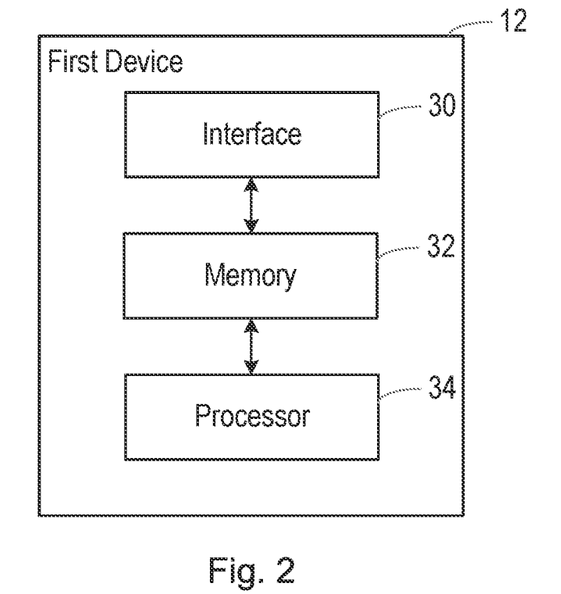
FIG. 2 illustrates an example of a first device in the system of FIG. 1.

FIG. 2 shows one possible form of the first device 12. In this example, the first device 12 includes an interface 30, for connecting to other devices; a memory 32, for storing data and program instructions; and a processor 34, for performing operations in accordance with program instructions stored in the memory 32. Thus, with reference to FIG. 1, the speaker recognition block 22 may be implemented by suitable program instructions stored in the memory 32, causing the processor 34 to perform the speaker recognition functionality.

Figure 3:
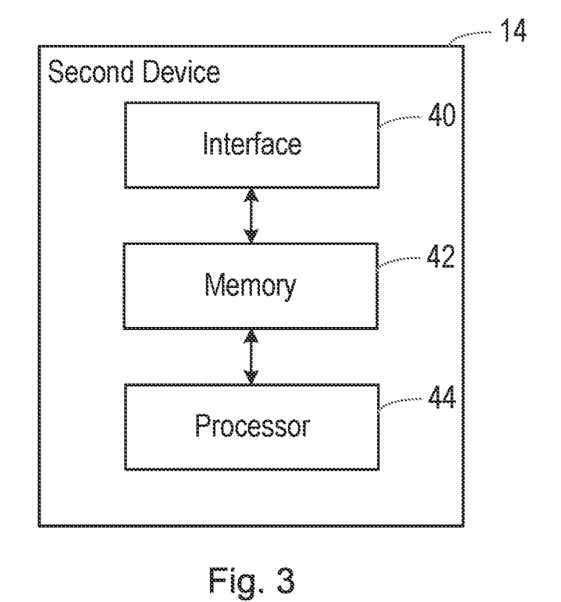
FIG. 3 illustrates an example of a second device in the system of FIG. 1.

FIG. 3 shows one possible form of the second device 14. In this example, the second device 14 includes an interface 40, for connecting to other devices; a memory 42, for storing data and program instructions; and a processor 44, for performing operations in accordance with program instructions stored in the memory 42. Thus, with reference to FIG. 1, the speech recognition block 24 may be implemented by suitable program instructions stored in the memory 42, causing the processor 44 to perform the speech recognition functionality.

In the system 10 shown in FIG. 1, the first device 12 and the second device 14 are typically physically separate devices, with some direct or indirect physical connection between them. For example, the first device 12 and the second device 14 may be separate integrated circuit devices, which may form part of the same product, or may be provided in separate products.

For example, the first device 12 and the second device 14 may be separate integrated circuits within a device such as a smartphone, or smart speaker, or another (portable) electronic device with some sort of voice operability, for example a tablet or laptop computer, a games console, a home control system, a home entertainment system, an in-vehicle entertainment system, a domestic appliance, or the like.

In other examples, the first device 12 and the second device 14 may be separate (portable) electronic devices.

Figure 4:
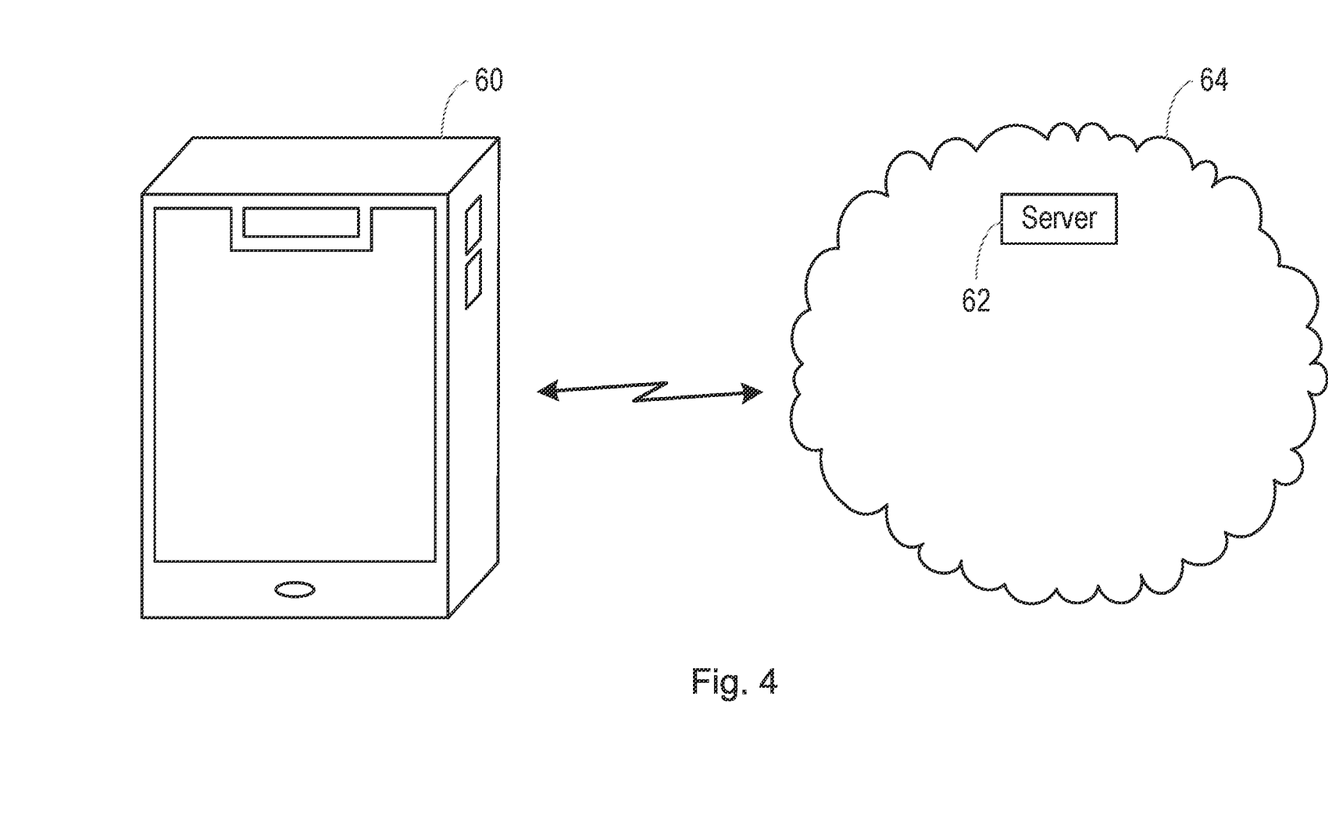
FIG. 4 illustrates an example of a system in accordance with FIG. 1.

FIG. 4 shows one example, where the first device 12 takes the form of a smartphone 60, or another (portable) electronic device with some sort of voice operability, for example a smart speaker, a tablet or laptop computer, a games console, a home control system, a home entertainment system, an in-vehicle entertainment system, a domestic appliance, or the like.

The smartphone 60 includes a speaker recognition block. Thus, the smartphone 60 also includes at least one microphone and, when it is determined that a sound detected by the microphone(s) contains speech, the speaker recognition block may for example determine whether or not the speaker is a specific individual, or may identify the speaker from a group of enrolled speakers.

The second device 14 is located remotely from the smartphone 60. For example, the second device 14 may take the form of a server 62 located in the cloud 64, accessible by the first device over a wireless communications network. The server 62 includes a speech recognition block. When a signal representing speech is supplied to the server 62, the speech recognition block may obtain information about the content of the speech, for example in order to be able to determine the content of a command.

Figure 5:
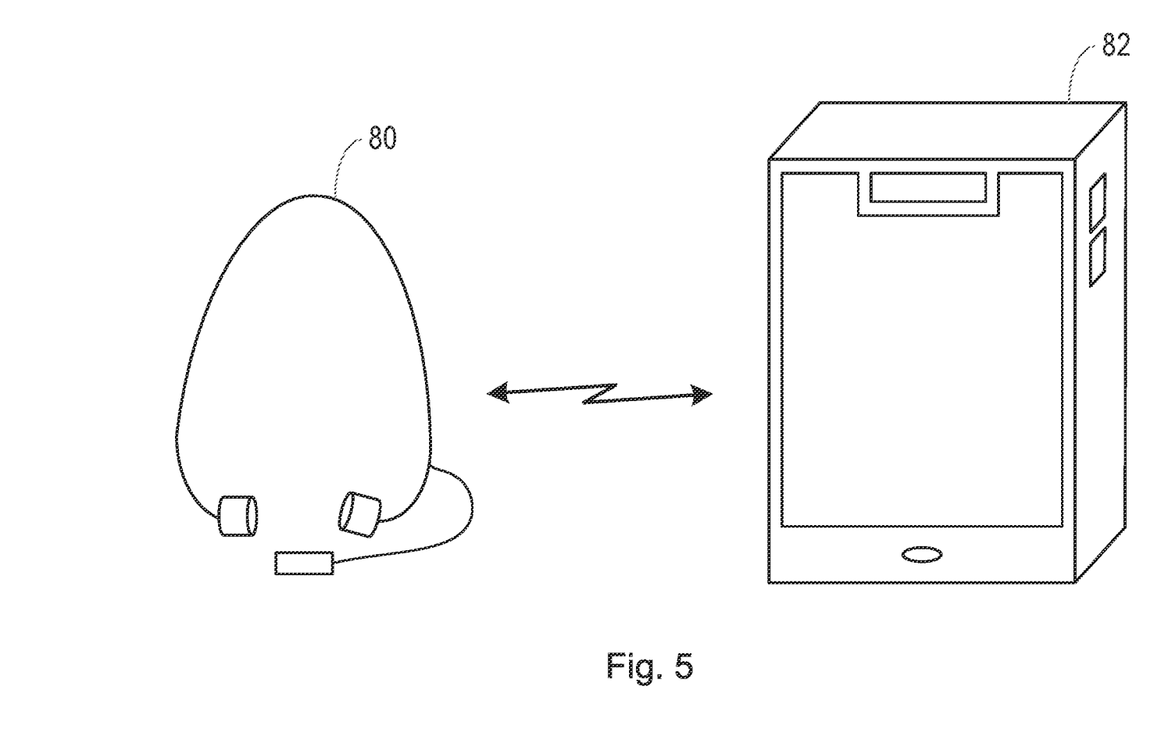
FIG. 5 illustrates an alternative example of a system in accordance with FIG. 1.

FIG. 5 shows another example, where the first device 12 takes the form of an accessory, for example a headset 80, which has a connection to a smartphone 60, or another (portable) electronic device with some sort of voice operability, for example a smart speaker, a tablet or laptop computer, a games console, a home control system, a home entertainment system, an in-vehicle entertainment system, a domestic appliance, or the like. The accessory 80 may have a connection to the host device 82 over a short-range communications link, such as a Bluetooth or WiFi connection.

The accessory 80 includes a speaker recognition block. Thus, the accessory 80 includes at least one microphone and, when it is determined that a sound detected by the microphone(s) contains speech, the speaker recognition block may for example determine whether or not the speaker is a specific individual, or may identify the speaker from a group of enrolled speakers.

The host device 82 includes a speech recognition block. When a signal representing speech is supplied to the host device 82, the speech recognition block may obtain information about the content of the speech, for example in order to be able to determine the content of a command.

Figure 6:
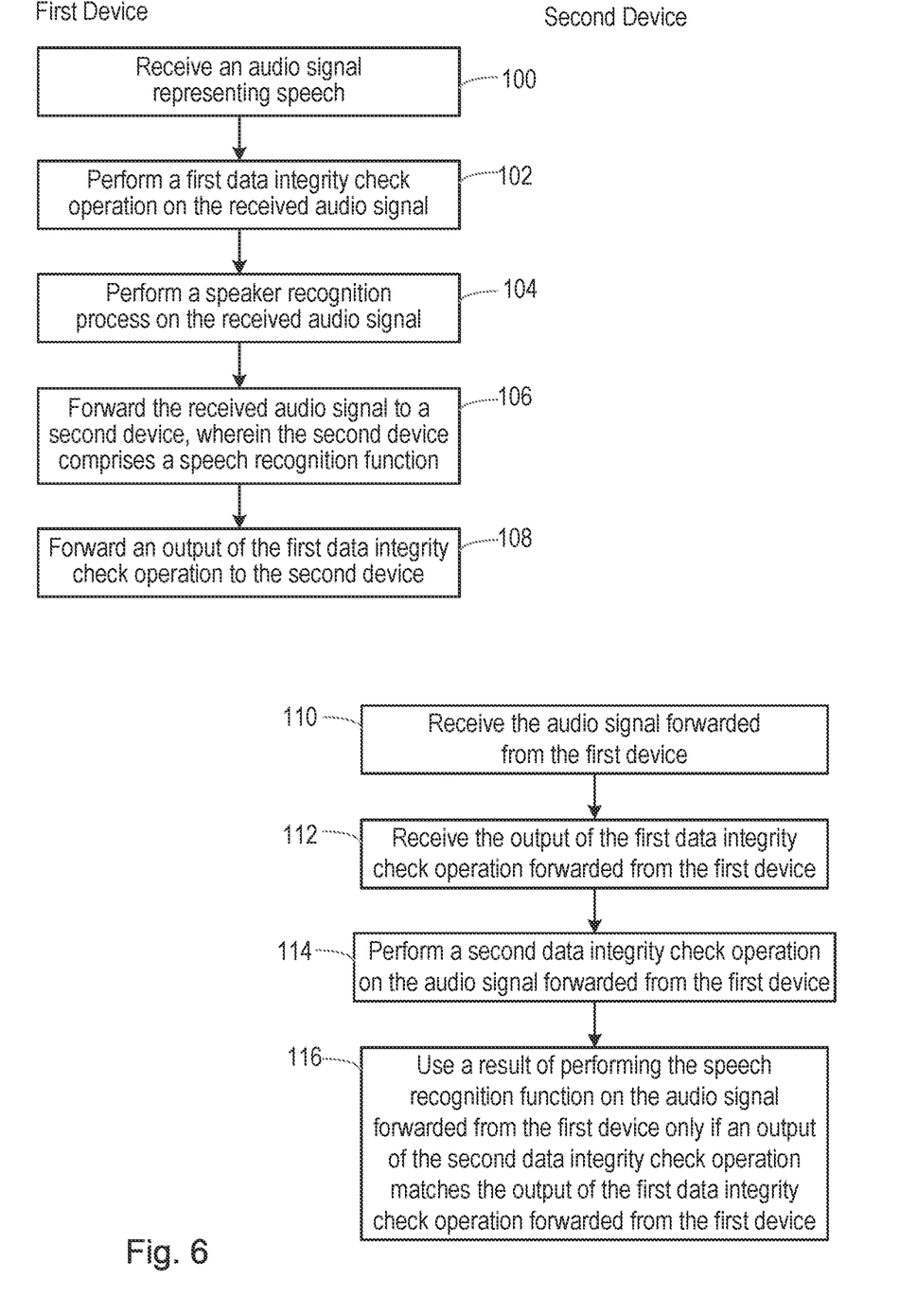
FIG. 6 is a flow chart, illustrating a method in accordance with an aspect of the invention.

FIG. 6 is a flow chart, illustrating an example of a method of performing speech recognition, in a system as illustrated in FIG. 1, 4, or 5, for example.

In step 100, a first device receives an audio signal representing speech.

At step 102, in the first device, a first data integrity check operation is performed on the received audio signal.

Any suitable data integrity check operation may be performed. For example, the step of performing a data integrity check operation may comprise generating a checksum value, or generating a Message Authentication Code based on the relevant part of the received audio signal. Typically, the relevant part of the received audio signal is a part that is intended to be forwarded to the second device. In some embodiments, the step of performing a data integrity check operation comprises obtaining a predetermined hash function from the relevant part of the received audio signal.

At step 104, in the first device, a speaker recognition process is performed on the received audio signal.

The speaker recognition process may be any suitable process, for example a voice biometric process, in which features are extracted from the received signal, and compared with a previously obtained model, or voiceprint, of the speech of one or more enrolled user. Depending on a required degree of security of the operation, the difference between the features and the model can be used to assess whether the comparison provides the required degree of confidence that the person speaking is the enrolled user.

When the audio signal is received, a voice activity detection process may be used to determine whether the signal represents speech. Only those parts of a received signal that do represent speech may be forwarded for subsequent processing. Once it has been determined that at least a part of the signal represents speech, a voice keyword detection process may be performed to determine whether the signal represents a predetermined trigger phrase. In that case, the first data integrity check operation and/or the speaker recognition process may be performed on the received audio signal only if it is determined that the audio signal represents the predetermined trigger phrase.

At step 106, the first device forwards the received audio signal to a second device, which has a speech recognition function.

Again, the first device may forward the received audio signal to the second device only if it has been determined that at least a part of the signal represents speech, and/or if it is determined that the audio signal represents the predetermined trigger phrase.

In addition, at step 108, the first device forwards an output of the first data integrity check operation to the second device.

At step 110, the second device receives the audio signal forwarded from the first device.

In addition, at step 112, the second device receives the output of the first data integrity check operation forwarded from the first device.

At step 114, the second device performs a second data integrity check operation on the audio signal forwarded from the first device. As described with reference to step 102, any suitable data integrity check operation may be performed. For example, the step of performing a data integrity check operation may comprise generating a checksum value, or generating a Message Authentication Code based on the received audio signal. Generally, the second data integrity check operation performed in the second device is the same as the first data integrity check operation performed in the first device. For example, when the step of performing a data integrity check operation in the first device comprises obtaining a predetermined hash function from the relevant part of the received audio signal, the step of performing the second data integrity check operation comprises performing the same predetermined hash function on the signal received in the second device.

The data integrity check operation is such that, provided that the operation is performed on the same input (i.e. the relevant part of the received audio signal) in steps 102 and 114, it will provide the same output. However, if it is performed on different inputs, for example because an attacker has inserted a rogue signal into the second device, the data integrity check operation will provide different outputs.

At step 116, a result of performing a speech recognition function in the second device on the audio signal forwarded from the first device is used, only if an output of the second data integrity check operation performed in the second device matches the output of the first data integrity check operation forwarded to the second device from the first device.

In addition, the result of performing the speech recognition function on the audio signal forwarded from the first device may be used only if a result of performing the speaker recognition process on the received audio signal in the first device satisfies a predetermined criterion.

If, in step 114, the output of the second data integrity check operation does not match the output of the first data integrity check operation forwarded from the first device, this may be due to an attack on the system, or it may be due to an unacceptably large Bit Error Rate (BER) on the communications link between the first device and the second device. If the speech recognition function has already been performed on the audio signal forwarded from the first device when it is determined that the output of the second data integrity check operation does not match the output of the first data integrity check operation forwarded from the first device, the result of performing the speech recognition function on the audio signal forwarded from the first device may be deleted.

Thus, if an attacker inserts a rogue signal into the second device, but provides a signal that passes the voice biometric identity check to the first device, the data integrity check operation will provide different outputs, and the positive result of the voice biometric identity check will not result in the rogue signal being taken as a genuine signal.

Although FIG. 6 shows various steps being performed sequentially in the first device, and then various other steps being performed sequentially in the second device, it should be noted that steps may be performed in parallel in some cases, and/or the order in which the steps are performed may differ from that shown in FIG. 6. In particular, the order in which the steps are performed in either one of the devices may differ from that described. In addition, or alternatively, one or more of the steps that are performed in the second device may be performed before one or more of the steps that are performed in the first device.

Figure 7:
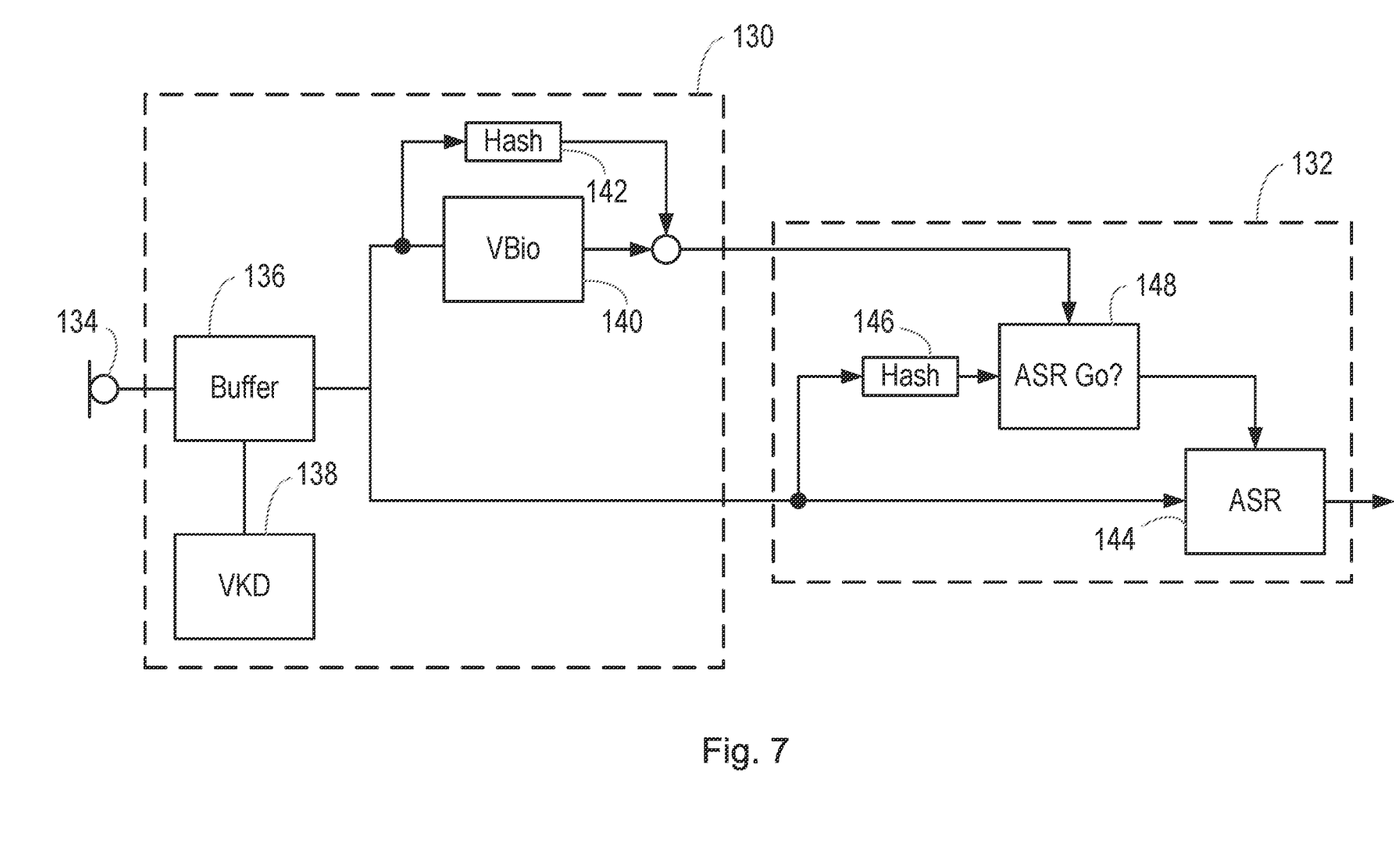
FIG. 7 illustrates an embodiment of a system in accordance with an aspect of the invention.

FIG. 7 is a block diagram, illustrating a first system for performing the method of FIG. 6.

The system includes a first device 130 and a second device 132. The system also includes a microphone 134 for detecting sounds in the vicinity. In embodiments such as those shown in FIGS. 4 and 5, the microphone 134 may be provided on the first device 130.

The system also includes a buffer 136, which performs initial processing on the signal generated by the microphone 134, and stores the result. For example, speaker recognition and speech recognition processes typically operate on signals that have been divided into frames having a duration of 10-30 ms, and so the buffer 136 may perform this division. Specifically, the buffer 136 may divide the signal into frames, and may include a voice activity detection block, configured to determine which frames contain speech. In embodiments such as those shown in FIGS. 4 and 5, the buffer 136 may be provided in the first device 130.

In the system illustrated in FIG. 7, the system also includes an optional voice keyword detection (VKD) block 138. This may be configured to detect whether the signal represents a predetermined keyword, or trigger phrase. The VKD block 138 may act only on frames that are determined as containing speech.

In some embodiments, the signal is only passed for subsequent processing if it is determined that the signal contains speech. In some embodiments, the signal is only passed for subsequent processing if it is determined that the signal contains the predetermined keyword.

The audio signal, or at least part of the audio signal, is passed to a voice biometric (VBio) or speaker recognition block 140. The speaker recognition block 140 performs a speaker recognition process as described with reference to step 104 above, and determines whether or not the speaker is a specific individual (in the case of speaker verification), or identifies the speaker from a group of enrolled speakers (in the case of speaker identification). Thus, the output of the speaker recognition block 140 may be a signal indicating whether or not the speaker is a specific individual, or may be a signal identifying the speaker.

The audio signal, or at least part of the audio signal, is also passed to a first data integrity check block 142. In this illustrated embodiment, the first data integrity check block 142 calculates a hash value from the received audio signal. The first data integrity check block 142 may determine a hash value, for example according to the known SHA-256 algorithm as will be understood by skilled in the art, although other hash functions may also be appropriate.

The audio signal, or the same part of the audio signal that is passed to the speaker recognition block 140 and the first data integrity check block 142, is also passed to the second device 132.

Specifically, the audio signal, or the part of the audio signal, is passed to an automatic speech recognition (ASR) function 144.

In addition, the audio signal, or the part of the audio signal, is passed to a second data integrity check block 146. In this illustrated embodiment, the second data integrity check block 146 calculates a hash value from the received audio signal, using the same method that is used by the first data integrity check block 142.

The output of the speaker recognition block 140 and the output of the first data integrity check block 142 are both passed to a block 148 which determines whether to proceed with automatic speech recognition (ASR Go?). The output of the second data integrity check block 146 is also passed to the block 148.

The block 148 compares the output of the first data integrity check block 142 with the output of the second data integrity check block 146.

The block 148 then controls the operation of the speech recognition function in the block 144, such that the speech recognition function is performed on the audio signal forwarded from the first device only if the output of the second data integrity check operation matches the output of the first data integrity check operation forwarded from the first device.

In addition, in this embodiment, the speech recognition function is performed on the audio signal forwarded from the first device only if the result of performing the speaker recognition process on the received audio signal satisfies a predetermined criterion, for example if the speaker is identified as a specific individual, or if the speaker is identified as a person who is authorised to issue a command to the device.

As described above, it is assumed that the output of the speaker recognition block 140 may be a signal indicating whether or not the speaker is a specific individual, or may be a signal identifying the speaker. In other embodiments, the output of the speaker recognition block 140 may for example be a signal indicating a likelihood of the speaker being a specific individual, and the block 148 may determine based on criteria set in the second device 132 whether this likelihood is high enough to proceed with automatic speech recognition.

If the block 144 is controlled such that the speech recognition function is performed on the audio signal forwarded from the first device, then the output of that block 144 is forwarded for subsequent processing. For example, the audio signal may contain a spoken command relating to a function of the first device 130, in which case the output of the speech recognition block 144 may be passed to the first device 130.

Figure 8:
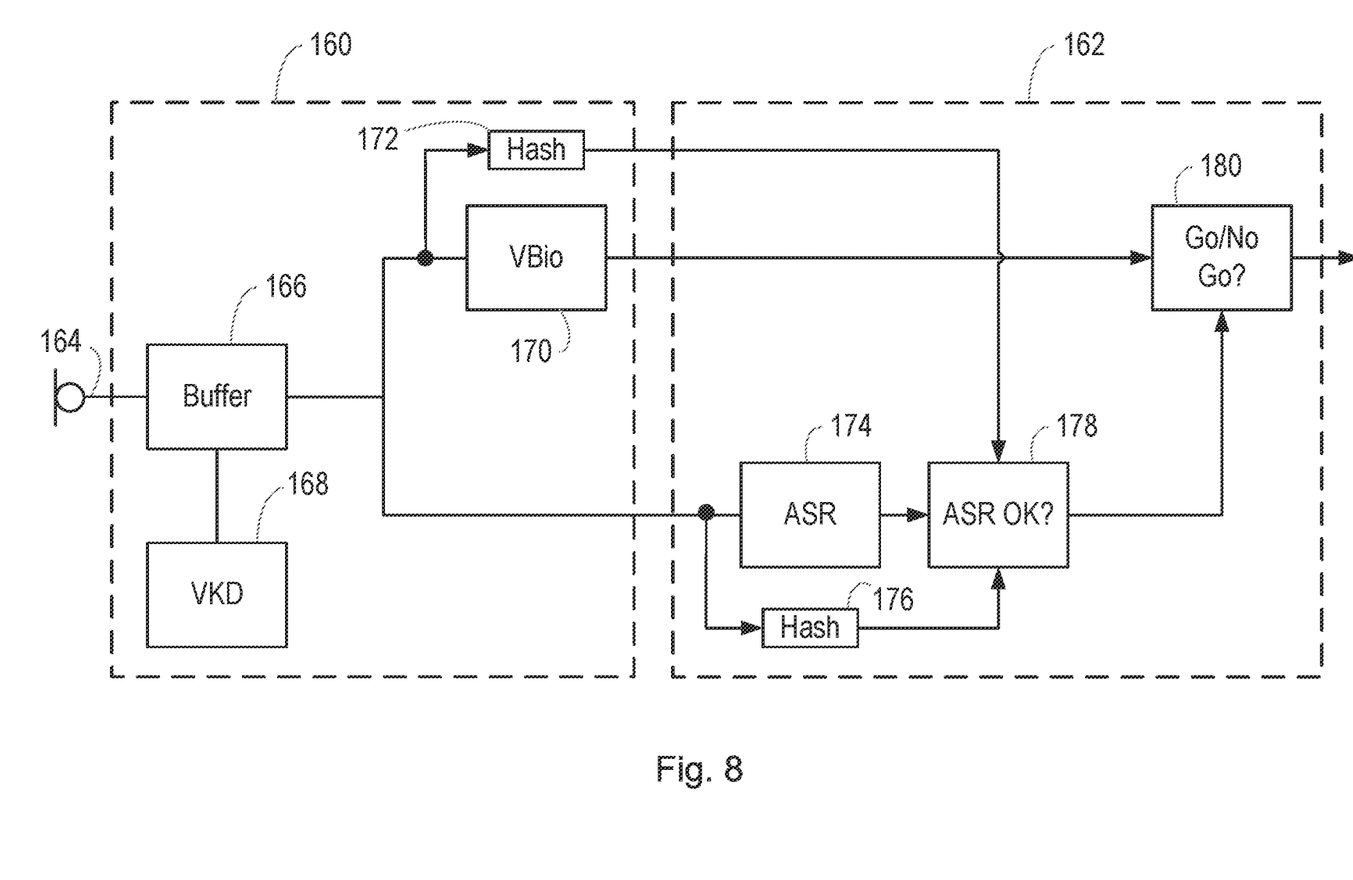
FIG. 8 illustrates an alternative embodiment of a system in accordance with an aspect of the invention.

FIG. 8 is a block diagram, illustrating a second system for performing the method of FIG. 6.

The system includes a first device 160 and a second device 162. The system also includes a microphone 164 for detecting sounds in the vicinity. In embodiments such as those shown in FIGS. 4 and 5, the microphone 164 may be provided on the first device 160.

The system also includes a buffer 166, which performs initial processing on the signal generated by the microphone 164, and stores the result. For example, speaker recognition and speech recognition processes typically operate on signals that have been divided into frames having a duration of 10-30 ms, and so the buffer 136 may perform this division. Specifically, the buffer 166 may divide the signal into frames, and may include a voice activity detection block, configured to determine which frames contain speech. In embodiments such as those shown in FIGS. 4 and 5, the buffer 166 may be provided in the first device 160.

In the system illustrated in FIG. 8, the system also includes an optional voice keyword detection (VKD) block 168. This may be configured to detect whether the signal represents a predetermined keyword, or trigger phrase. The VKD block 168 may act only on frames that are determined as containing speech.

In some embodiments, the signal is only passed for subsequent processing if it is determined that the signal contains speech. In some embodiments, the signal is only passed for subsequent processing if it is determined that the signal contains the predetermined keyword.

The audio signal, or at least part of the audio signal, is passed to a voice biometric (VBio) or speaker recognition block 170. The speaker recognition block 170 performs a speaker recognition process as described with reference to step 104 above, and determines whether or not the speaker is a specific individual (in the case of speaker verification), or identifies the speaker from a group of enrolled speakers (in the case of speaker identification). Thus, the output of the speaker recognition block 170 may be a signal indicating whether or not the speaker is a specific individual, or may be a signal identifying the speaker.

The audio signal, or at least part of the audio signal, is also passed to a first data integrity check block 172. In this illustrated embodiment, the first data integrity check block 172 calculates a hash value from the received audio signal. The first data integrity check block 172 may determine a hash value, for example according to the known SHA-256 algorithm as will be understood by skilled in the art, although other hash functions may also be appropriate.

The audio signal, or the same part of the audio signal that is passed to the speaker recognition block 170 and the first data integrity check block 172, is also passed to the second device 162.

Specifically, the audio signal, or the part of the audio signal, is passed to an automatic speech recognition (ASR) function 174. In this embodiment, the automatic speech recognition function may be performed as soon as the audio signal is received by the second device 162, without deliberate delay. Thus, for example, the speech recognition function may be performed by the block 174 at least partly in parallel with the speaker recognition function being performed by the block 170, in order to minimize overall processing time.

In addition, the audio signal, or the part of the audio signal, is passed to a second data integrity check block 176. In this illustrated embodiment, the second data integrity check block 176 calculates a hash value from the received audio signal, using the same method that is used by the first data integrity check block 172.

The output of the first data integrity check block 172 is passed to a block 178 which determines whether to use the result of automatic speech recognition (ASR OK?). The output of the second data integrity check block 176 is also passed to the block 178.

The block 178 compares the output of the first data integrity check block 172 with the output of the second data integrity check block 176.

The block 178 then controls the operation of the output of the speech recognition function in the block 174, such that the output of the speech recognition function is forwarded for subsequent processing only if the output of the second data integrity check operation matches the output of the first data integrity check operation forwarded from the first device.

If it is determined that the output of the second data integrity check operation matches the output of the first data integrity check operation forwarded from the first device, the result of the automatic speech recognition is forwarded for subsequent processing only if the result of performing the speaker recognition process on the received audio signal satisfies a predetermined criterion, for example if the speaker is identified as a specific individual, or if the speaker is identified as a person who is authorised to issue a command to the device.

In this embodiment, the output of the speaker recognition block 170 is passed to a block 180 (Go/No Go?) which determines whether the received audio signal satisfies the predetermined criterion. The block 180 is shown as being in the second device 162, but may be in the first device 160.

As described above, it is assumed that the output of the speaker recognition block 170 may be a signal indicating whether or not the speaker is a specific individual, or may be a signal identifying the speaker. In other embodiments, the output of the speaker recognition block 170 may for example be a signal indicating a likelihood of the speaker being a specific individual, and the block 180 may determine based on criteria set in the first device 160 or the second device 162 whether this likelihood is high enough to use the result of the automatic speech recognition. The criteria set in the first device 160 or the second device 162 may depend on the result of the automatic speech recognition itself. For example, a command to a smart speaker device to play a particular piece of music may be acted upon even if the system has relatively low confidence that the speaker is a specified individual, because the adverse consequences of wrongly playing that music are not great. However, a command to a banking app on a smartphone to make a (large) payment may be acted upon only if the system has relatively high confidence that the speaker is the specified individual, because the adverse consequences of wrongly making that payment are much greater.

If the block 180 determines that the output of the speech recognition function that is performed on the audio signal forwarded from the first device should be used, then the output of that block 174 is forwarded for subsequent processing. For example, the audio signal may contain a spoken command relating to a function of the first device 160, in which case the output of the speech recognition block 174 may be passed to the first device 160. As already noted, the block 180 may itself be located in the first device 160.

If the block 180 determines that the output of the speech recognition function that is performed on the audio signal forwarded from the first device should not be used, then the output of the speech recognition block 174 may be explicitly deleted from the second device 162, and may additionally or alternatively be deleted from the first device 160 if it has been sent there. Similarly, if the bock 178 determines that the output of the second data integrity check operation does not match the output of the first data integrity check operation forwarded from the first device, then the output of the speech recognition block 174 may be explicitly deleted from the second device 162, and may additionally or alternatively be deleted from the first device 160 if it has been sent there.

Figure 9:
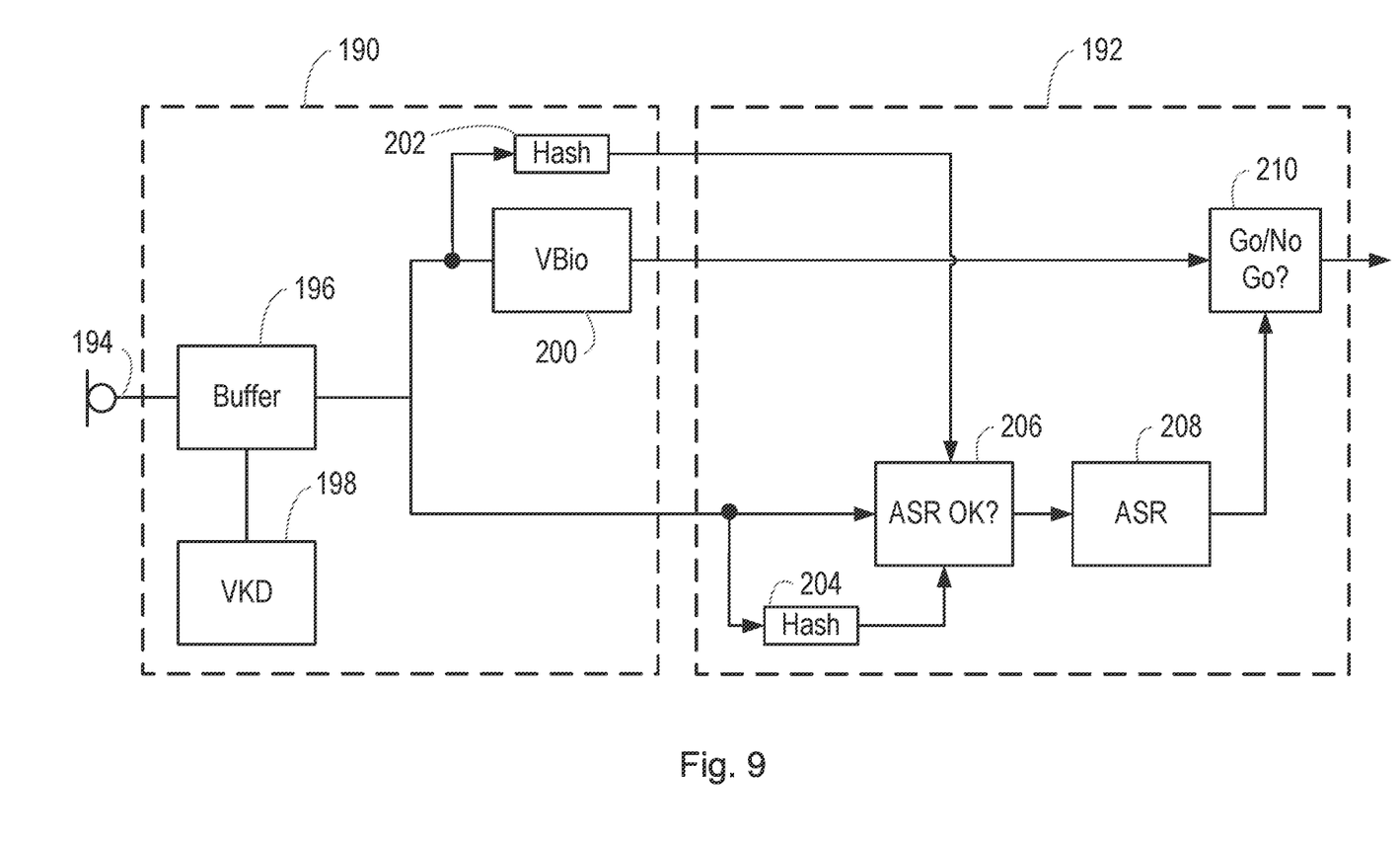
FIG. 9 illustrates a further alternative embodiment of a system in accordance with an aspect of the invention.

FIG. 9 is a block diagram, illustrating a third system for performing the method of FIG. 6.

The system includes a first device 190 and a second device 192. The system also includes a microphone 194 for detecting sounds in the vicinity. In embodiments such as those shown in FIGS. 4 and 5, the microphone 194 may be provided on the first device 190.

The system also includes a buffer 196, which performs initial processing on the signal generated by the microphone 194, and stores the result. For example, speaker recognition and speech recognition processes typically operate on signals that have been divided into frames having a duration of 10-30 ms, and so the buffer 196 may perform this division. Specifically, the buffer 196 may divide the signal into frames, and may include a voice activity detection block, configured to determine which frames contain speech. In embodiments such as those shown in FIGS. 4 and 5, the buffer 196 may be provided in the first device 190.

In the system illustrated in FIG. 9, the system also includes an optional voice keyword detection (VKD) block 198. This may be configured to detect whether the signal represents a predetermined keyword, or trigger phrase. The VKD block 198 may act only on frames that are determined as containing speech.

In some embodiments, the signal is only passed for subsequent processing if it is determined that the signal contains speech. In some embodiments, the signal is only passed for subsequent processing if it is determined that the signal contains the predetermined keyword.

The audio signal, or at least part of the audio signal, is passed to a voice biometric (VBio) or speaker recognition block 200. The speaker recognition block 200 performs a speaker recognition process as described with reference to step 104 above, and determines whether or not the speaker is a specific individual (in the case of speaker verification), or identifies the speaker from a group of enrolled speakers (in the case of speaker identification). Thus, the output of the speaker recognition block 200 may be a signal indicating whether or not the speaker is a specific individual, or may be a signal identifying the speaker.

The audio signal, or at least part of the audio signal, is also passed to a first data integrity check block 202. In this illustrated embodiment, the first data integrity check block 202 calculates a hash value from the received audio signal. The first data integrity check block 202 may determine a hash value, for example according to the known SHA-256 algorithm as will be understood by skilled in the art, although other hash functions may also be appropriate.

The audio signal, or the same part of the audio signal that is passed to the speaker recognition block 200 and the first data integrity check block 202, is also passed to the second device 192.

In the second device 192, the audio signal, or the part of the audio signal, is passed to a second data integrity check block 204. In this illustrated embodiment, the second data integrity check block 204 calculates a hash value from the received audio signal, using the same method that is used by the first data integrity check block 202.

The output of the first data integrity check block 202 is passed to a block 206 which determines whether to proceed with automatic speech recognition (ASR OK?). The output of the second data integrity check block 204 is also passed to the block 206.

The block 206 compares the output of the first data integrity check block 202 with the output of the second data integrity check block 204.

The block 206 then controls the operation of the speech recognition function in an automatic speech recognition (ASR) block 208 in the second device 192, such that the speech recognition function is performed on the audio signal forwarded from the first device only if the output of the second data integrity check operation matches the output of the first data integrity check operation forwarded from the first device.

In this embodiment, the comparison of the output of the first data integrity check block 202 with the output of the second data integrity check block 204 automatic speech recognition function may be performed as soon as the audio signal is received by the second device 192, without deliberate delay. Thus, for example, the comparison may be performed by the block 206 at least partly in parallel with the speaker recognition function being performed by the block 200, in order to minimize overall processing time. Further, if the comparison test is passed, the automatic speech recognition function may be performed by the ASR function 208 without additional deliberate delay. Thus, for example, the speech recognition function may be performed by the block 208 at least partly in parallel with the speaker recognition function being performed by the block 170, in order to minimize overall processing time.

If it is determined that the output of the second data integrity check operation matches the output of the first data integrity check operation forwarded from the first device, the automatic speech recognition process is performed, but the result of the automatic speech recognition is forwarded for subsequent processing only if the result of performing the speaker recognition process on the received audio signal satisfies a predetermined criterion, for example if the speaker is identified as a specific individual, or if the speaker is identified as a person who is authorised to issue a command to the device.

In this embodiment, the output of the speaker recognition block 200 is passed to a block 210 (Go/No Go?) which determines whether the received audio signal satisfies the predetermined criterion. The block 210 is shown as being in the second device 192, but may be in the first device 190.

As described above, it is assumed that the output of the speaker recognition block 200 may be a signal indicating whether or not the speaker is a specific individual, or may be a signal identifying the speaker. In other embodiments, the output of the speaker recognition block 200 may for example be a signal indicating a likelihood of the speaker being a specific individual, and the block 210 may determine based on criteria set in the first device 190 or the second device 192 whether this likelihood is high enough to use the result of the automatic speech recognition. The criteria set in the first device 190 or the second device 192 may depend on the result of the automatic speech recognition itself. For example, a command to a smart speaker device to play a particular piece of music may be acted upon even if the system has relatively low confidence that the speaker is a specified individual, because the adverse consequences of wrongly playing that music are not great. However, a command to a banking app on a smartphone to make a (large) payment may be acted upon only if the system has relatively high confidence that the speaker is the specified individual, because the adverse consequences of wrongly making that payment are much greater.

If the block 210 determines that the output of the speech recognition function that is performed on the audio signal forwarded from the first device should be used, then the output of that block 208 is forwarded for subsequent processing. For example, the audio signal may contain a spoken command relating to a function of the first device 190, in which case the output of the speech recognition block 208 may be passed to the first device 190. As already noted, the block 210 may itself be located in the first device 190.

If the block 210 determines that the output of the speech recognition function that is performed on the audio signal forwarded from the first device should not be used, then the output of the speech recognition block 208 may be explicitly deleted from the second device 192, and may additionally or alternatively be deleted from the first device 190 if it has been sent there.

Thus, in all of the illustrated embodiments, a result of performing the speech recognition function on the audio signal forwarded from the first device is used only if an output of the second data integrity check operation matches the output of the first data integrity check operation forwarded from the first device. This may be achieved either by performing the speech recognition function on the audio signal forwarded from the first device only if the output of the second data integrity check operation matches the output of the first data integrity check operation forwarded from the first device, or by pre-emptively performing the speech recognition function on the audio signal forwarded from the first device and using the result thereof only if the output of the second data integrity check operation matches the output of the first data integrity check operation forwarded from the first device.

The skilled person will recognise that some aspects of the above-described apparatus and methods, for example the discovery and configuration methods may be embodied as processor control code, for example on a non-volatile carrier medium such as a disk, CD- or DVD-ROM, programmed memory such as read only memory (Firmware), or on a data carrier such as an optical or electrical signal carrier. For many applications, embodiments will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re) programmable analogue array or similar device in order to configure analogue hardware.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope

The invention claimed is:

1. A method of performing speech recognition, comprising:
at a first device:
receiving an audio signal representing speech;
performing a first data integrity check operation on the received audio signal, the first data integrity check operation comprising calculating a first hash value from the received audio signal;
forwarding the received audio signal to a second device; and
forwarding the first hash value calculated in the first data integrity check operation to the second device; and
at the second device:
receiving the audio signal forwarded from the first device;
receiving the first hash value calculated in the first data integrity check operation forwarded from the first device;
performing a second data integrity check operation on the audio signal forwarded from the first device, the second data integrity check operation comprising calculating a second hash value from the received audio signal using the same method that is used by the first data integrity check operation;
performing a speech recognition function on the audio signal forwarded from the first device;
determining if the second hash value calculated in the second data integrity check operation matches the first hash value calculated in the first data integrity check operation forwarded from the first device; and
using a result of performing the speech recognition function on the audio signal forwarded from the first device only if the second hash value calculated in the second data integrity check operation matches the first hash value calculated in the first data integrity check operation forwarded from the first device.

2. A method according to claim 1, further comprising:
at the first device, performing a speaker recognition process on the received audio signal; and
at the second device, using a result of performing the speech recognition function on the audio signal forwarded from the first device only if a result of performing the speaker recognition process on the received audio signal satisfies a predetermined criterion.

3. A method according to claim 1, further comprising:
if the output of the second data integrity check operation does not match the output of the first data integrity check operation forwarded from the first device, deleting the result of performing the speech recognition function on the audio signal forwarded from the first device.

4. A method according to claim 1, further comprising:
at the first device, performing a speaker recognition process on the received audio signal; and
at the second device, performing the speech recognition function on the audio signal in the second device at least partly in parallel with performing the speaker recognition process on the received audio signal in the first device.

5. A method according to claim 1, further comprising:
at the first device, performing a speaker recognition process on the received audio signal; and
determining in the second device if the output of the second data integrity check operation matches the output of the first data integrity check operation forwarded from the first device, at least partly in parallel with performing the speaker recognition process on the received audio signal in the first device.

6. A method according to claim 5, comprising, if it is determined in the second device that the output of the second data integrity check operation matches the output of the first data integrity check operation forwarded from the first device, performing the speech recognition function on the audio signal in the second device at least partly in parallel with performing the speaker recognition process on the received audio signal in the first device.

7. A method according to claim 1, comprising performing the first data integrity check operation on the received audio signal only if it is determined that the audio signal represents a predetermined trigger phrase.

8. A method according to claim 1, wherein the step of performing the first data integrity check operation comprises obtaining a predetermined hash function, and wherein the step of performing the second data integrity check operation comprises obtaining said predetermined hash function.

9. A system for performing speech recognition, comprising:
a first device and a second device,
wherein the first device comprises:
an input for receiving an audio signal representing speech;
a processor for performing a first data integrity check operation on the received audio signal, the second data integrity check operation comprising calculating a second hash value from the received audio signal using the same method that is used by the first data integrity check operation; and
an interface for forwarding the received audio signal to the second device, and for forwarding the first hash value calculated in the first data integrity check operation to the second device; and
wherein the second device comprises:
an interface for receiving the audio signal forwarded from the first device, and for receiving the first hash value calculated in the first data integrity check operation forwarded from the first device, the second data integrity check operation comprising calculating a second hash value from the received audio signal using the same method that is used by the first data integrity check operation; and
a processor for performing a second data integrity check operation on the audio signal forwarded from the first device, performing a speech recognition function on the audio signal forwarded from the first device and determining if the second hash value calculated in the second data integrity check operation matches the first hash value calculated in the first data integrity check operation forwarded from the first device;
wherein the system is configured to use a result of performing the speech recognition function on the audio signal forwarded from the first device only if the second hash value calculated in the second data integrity check operation matches the first hash value calculated in the first data integrity check operation forwarded from the first device.

10. A system according to claim 9, wherein:
the processor of the first device is configured to perform a speaker recognition function on the received audio signal; and
the system is configured to use the result of performing the speech recognition function on the audio signal forwarded from the first device only if a result of performing the speaker recognition process on the received audio signal satisfies a predetermined criterion.

11. A system according to claim 9, wherein the system is further configured for:
if the output of the second data integrity check operation does not match the output of the first data integrity check operation forwarded from the first device, deleting the result of performing the speech recognition function on the audio signal forwarded from the first device.

12. A system according to claim 9, wherein:
the processor of the first device is configured to perform a speaker recognition function on the received audio signal; and
the system is further configured for performing the speech recognition function on the audio signal in the second device at least partly in parallel with performing the speaker recognition process on the received audio signal in the first device.

13. A system according to claim 9, wherein:
the processor of the first device is configured to perform a speaker recognition function on the received audio signal; and
the second device is further configured for determining if the output of the second data integrity check operation matches the output of the first data integrity check operation forwarded from the first device, at least partly in parallel with performing the speaker recognition process on the received audio signal in the first device.

14. A system according to claim 13, wherein the second device is further configured for, if it is determined that the output of the second data integrity check operation matches the output of the first data integrity check operation forwarded from the first device, performing the speech recognition function on the audio signal in the second device at least partly in parallel with performing the speaker recognition process on the received audio signal in the first device.

15. A system according to claim 9, wherein the first device is configured for performing the first data integrity check operation on the received audio signal only if it is determined that the audio signal represents a predetermined trigger phrase.

16. A system according to claim 9, wherein performing the first data integrity check operation comprises obtaining a predetermined hash function, and wherein performing the second data integrity check operation comprises obtaining said predetermined hash function.

17. A second device, comprising:
- an interface for receiving an audio signal representing speech forwarded from a first device, and for receiving a first hash value calculated in a first data integrity check operation forwarded from the first device, the first device for performing a speaker recognition process on the audio signal; and
- a processor for:
  - performing a second data integrity check operation on the audio signal forwarded from the first device, the second data integrity check operation comprising calculating a second hash value from the received audio signal using the same method that is used by the first data integrity check operation;
  - performing a speech recognition function on the audio signal forwarded from the first device; and
  - determining if the second hash value calculated in the second data integrity check operation matches the first hash value calculated in the first data integrity check operation forwarded from the first device;
- wherein the second device is configured to use a result of performing a speech recognition function on the audio signal forwarded from the first device only if the second hash value calculated in the second data integrity check operation matches the first hash value calculated in the first data integrity check operation forwarded from the first device.

* * * * *

UNITED STATES PATENT AND TRADEMARK OFFICE
CERTIFICATE OF CORRECTION

PATENT NO. : 11,935,541 B2
APPLICATION NO. : 17/121153
DATED : March 19, 2024
INVENTOR(S) : John Paul Lesso It is certified that error appears in the above-identified patent and that said Letters Patent is hereby corrected as shown below:

In the Claims

In Column 17, Lines 53-54, in Claim 9, delete "the second data integrity check operation" and insert -- the first data integrity check operation --, therefor.

Signed and Sealed this
Twenty-second Day of October, 2024

Katherine Kelly Vidal
*Director of the United States Patent and Trademark Office*